Figure 1:
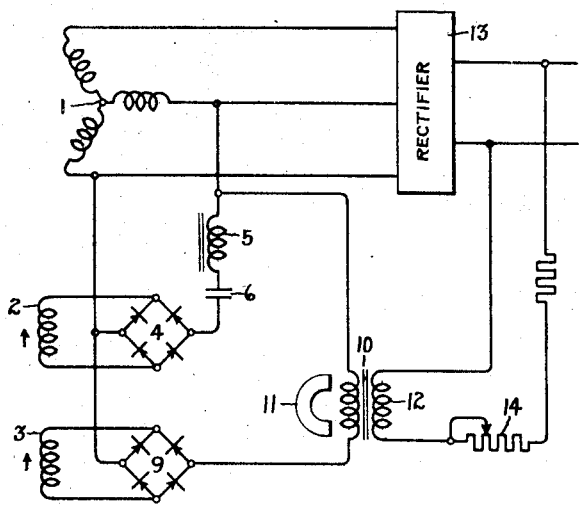

Inventors:
Frederick E. Crever,
Jerry L. Stratton,
by Harry E. Dunham
Their Attorney.

Patented Nov. 28, 1944

2,363,857

UNITED STATES PATENT OFFICE 2,363,857

REGULATING CIRCUIT

Frederick E. Crever, Scotia, and Jerry L. Stratton, Schenectady, N. Y., assignors to General Electric Company, a corporation of New York Application December 30, 1941, Serial No. 424,918

8 Claims. (Cl. 171—223)

This invention relates to automatic regulating circuits for dynamo-electric machines, and more particularly to an improved automatic voltage regulating circuit for self-excited dynamo-electric generators.

It is well known that the voltage of a dynamo-electric generator is proportional to its speed and its exciting flux. If saturation is neglected the exciting flux of a self-excited generator is also proportional to its voltage and therefore the voltage of such machine is in general proportional to the square of its speed. Saturation, of course, modifies this relation somewhat but nevertheless if the generator is driven over a wide range of speed an automatic voltage regulator for the generator has to have an abnormally wide range of control in order to maintain the voltage constant.

In accordance with this invention there is provided a novel and simple arrangement for greatly reducing the duty imposed on an automatic voltage regulator for this service. This arrangement is characterized by obtaining some of the exciting current of the generator from an alternating voltage derived from the regulated generator, and whose frequency is proportional to the speed of the generator, and passing this current through a series reactor. The reactance of the reactor, being proportional to the frequency, can be made to change the exciting current which it controls in inverse relation to the speed or frequency of the regulated machine at constant voltage. In this manner the regulator is relieved of a substantial part of its burden. In addition to the reactor a capacitor connected in series therewith is employed for producing an inverse exciting current versus frequency or speed relation which more nearly matches or parallels the saturation characteristic of the generator. As is well known, this saturation characteristic reverses the relation between generator voltage and excitation. Furthermore, a novel and simple automatic generator voltage regulator is provided. This regulator is characterized by the use of a presaturated reactor.

An object of the invention is to provide a new and improved automatic regulator circuit.

Another object of the invention is to provide an improved automatic voltage regulating circuit for variable speed dynamo-electric machines.

A further object of the invention is to provide a rugged, simple and inexpensive circuit arrangement for reducing the duty on an automatic voltage regulator for a variable speed generator.

The invention will be better understood from the following description taken in connection with the accompanying drawing and its scope will be pointed out in the appended claims.

Figure 2:
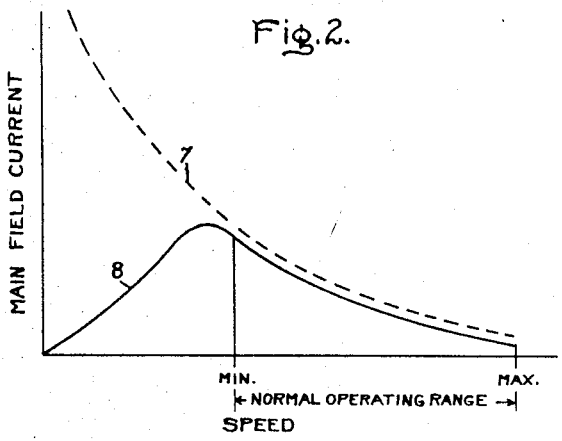

In the drawing Fig. 1 illustrates diagrammatically an embodiment of the invention and Fig. 2 illustrates the operating characteristic of the series reactor-capacitor combination.

Referring now to the drawing and more particularly to Fig. 1, there is shown therein by way of example an alternating-current generator having an armature winding 1 and a pair of field windings 2 and 3. This generator is adapted to be driven over a wide range of speeds and it is the function of the control and regulating circuits for the field windings 2 and 3 to maintain the voltage of the generator substantially constant over this wide range of speeds. To this end the field winding 2 is a main field winding for providing a basic amount of excitation which is made to vary inversely with the speed of the generator in such a manner as to maintain its voltage approximately constant. The field winding 3 is a regulating field winding whose energization is controlled by automatic voltage sensitive regulating means so as to provide the marginal amount of excitation necessary to provide the required degree of constancy of voltage over the operating speed range. The inverse energization of the main field winding 2 is provided by energizing it from across the alternating-current terminals of the generator through a rectifier 4 in series with whose input side there is connected a reactor 5 and a capacitor 6.

The action of this circuit may be understood more clearly by reference to Fig. 2 wherein the dashed curve 7 represents the relation between speed and current in the main field winding in order to maintain constant generator voltage. The solid curve 8 represents the characteristic of the main field circuit which includes the reactor 5 and the capacitor 6. As is to be expected, this has a zero value of current at zero speed, the current then increasing up to a definite maximum point corresponding to resonance between the reactor and the capacitor. Thereafter the current falls off with further increases in speed and it has been found that the slope of the characteristic beyond or above the resonance point parallels very closely the required characteristic 7 for maintaining constant voltage. The normal operating range of speeds is chosen so as to lie wholly within the zone of speeds beyond or above resonance.

Regulating field winding 3 provides the additional amount of excitation or ampere turns necessary to bring the voltage up to 100 per cent. This winding is also energized from across the alternating voltage of the generator through a rectifier 9 in series with whose input side there is connected a desaturating reactor 10. This reactor is presaturated by suitable means, the preferred means being a permanent magnet 11 and for close regulation the amount of presaturation should be many times that necessary to just reach the knee of the saturation curve. The reactance of the reactor is controlled by a desaturating control winding 12 energized from across the voltage of the generator through a third rectifier 13. In cases where it is desired to obtain direct-current power output from the generator the rectifier 13 may be a main power rectifier.

The operation of Fig. 1 is as follows: The current in the desaturating winding 12 is adjusted by means of the rheostat 14 so that the reactor 10 permits the correct amount of current to flow through the field winding 3 so that the sum of the ampere turns of the windings 2 and 3 is just sufficient to supply the desired generator voltage. If then the generator speed changes for any reason the operation of the reactor-capacitor combination will change the energization of the main field winding so as to provide almost complete compensation for the change in speed with the result that the voltage will stay substantially constant. Any deficiency in the action of the reactor-capacitor combination will be automatically made up for by the regulating reactor. Thus, if the voltage falls below normal the accompanying weakening of the desaturating effect of the winding 12 will decrease the reactance of the reactor 10, thereby increasing the current in the field winding 3 and bringing the voltage up to normal. In a like manner, if the voltage rises above normal the accompanying increase in desaturating effect of the winding 12 will increase the reactance of the reactor 10 thereby reducing the current in the regulating winding 3 and bringing the voltage back to normal.

By means of this arrangement it is possible to obtain constant generator voltage, either alternating current or direct current, over a wide range of generator speeds without the use of commutators or reverse current relays. Furthermore, if the generator is of the high frequency inductor type in which only the rotor revolves and the windings are stationary, slip rings may also be eliminated.

The three rectifiers 4, 9 and 13 may be of any suitable type, a preferred type being the dry selenium disk type.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States is:

1. In combination, a variable speed dynamo-electric generator having an armature winding and an effectively shunt connected field winding, said armature winding having induced therein an alternating voltage whose frequency is proportional to the speed of said generator and whose magnitude is proportional to the flux produced by said field winding, voltage control means for said generator comprising a reactor connected in series circuit relation with said field winding, and voltage regulating means for said generator comprising armature winding voltage responsive control means for the field flux of said generator, said regulating means being separate from and independent of said reactor and providing field flux for said generator which is cumulative with the flux produced by said field winding.

2. In combination, a variable speed dynamo-electric generator having a rotor, an armature winding and an effectively shunt connected field winding, said armature winding having induced therein an alternating voltage whose frequency is proportional to the speed of said rotor and whose magnitude is proportional to the flux produced by said field winding, a reactor connected in series circuit relation with said field winding, an additional shunt field winding, and armature winding voltage responsive regulating means for the current in said additional shunt field winding.

3. In combination, a dynamo-electric generator having an armature winding and a field winding, said generator having a particular inverse relation between field current and rotational speed at a predetermined constant value of armature voltage, means responsive to the frequency of the voltage induced in said armature winding including a reactor and capacitor for energizing said field winding with current which varies with said frequency in substantial correspondence with said inverse relation, and means including an additional field winding responsive to the value of said voltage for controlling the excitation of said generator so as to maintain said voltage constant over a wide range of speed.

4. In combination, a dynamo-electric generator having a field winding and an armature winding in which said field winding induces an alternating voltage, means including a saturating reactor for connecting said field winding to be energized in accordance with said voltage, means for presaturating said reactor, a desaturating control winding on said reactor, means for converting said alternating voltage to unidirectional voltage and energizing said desaturating control winding in accordance with said unidirectional voltage, and auxiliary means for varying the excitation of said generator inversely with variations in speed of said generator.

5. In combination, a dynamo-electric generator having a field winding and an armature winding in which said field winding induces an alternating voltage, means including a saturating reactor for connecting said field winding to be energized in accordance with said voltage, means for presaturating said reactor, a desaturating control winding on said reactor, means for converting sail alternating voltage to unidirectional voltage and energizing said desaturating control winding in accordance with said unidirectional voltage, and auxiliary means including a reactor for varying the excitation of said generator inversely with variations in speed of said generator.

6. In combination, a dynamo-electric generator having a field winding and an armature winding in which said field winding induces an alternating voltage, means including a saturating reactor for connecting said field winding to be energized in accordance with said voltage, means for presaturating said reactor, a desaturating control winding on said reactor, means for converting said alternating voltage to unidirectional voltage and energizing said desaturating control winding in accordance with said unidirectional voltage, and auxiliary means including a reactor and a capacitor in series for varying the excitation of said generator inversely with variations in speed of said generator.

7. In combination, an alternator having an armature and a pair of direct-current field windings, a circuit including a rectifier for energizing one of said field windings in accordance with the voltage of said alternator, a reactor and a capacitor connected in series in the input side of said rectifier, a circuit including a second rectifier for energizing the other field winding in accordance with the voltage of said alternator, a saturable core reactor connected in the input side of said second rectifier, means for presaturating said reactor, a desaturating control winding on said reactor, and means including a third rectifier for energizing said desaturating control winding in accordance with the voltage of said alternator.

8. In combination, a three-phase alternator having an armature and a pair of cumulatively-acting direct-current field windings, a circuit including a rectifier for energizing one of said field windings in accordance with the voltage of said alternator, a reactor and a capacitor connected in series in the input side of said rectifier, a circuit including a second rectifier for energizing the other field winding in accordance with the voltage of said alternator, a saturable core reactor connected in the input side of said second rectifier, means including a permanent magnet for presaturating said reactor, a desaturating control winding on said reactor, and means including a main power rectifier for energizing said desaturating control winding in accordance with the voltage of said alternator.

FREDERICK E. CREVER.
JERRY L. STRATTON.